(12) United States Patent
Bontus (10) Patent No.: US 11,954,769 B2
(45) Date of Patent: Apr. 9, 2024

(54) SYSTEM FOR RECONSTRUCTING AN IMAGE OF AN OBJECT

(71) Applicant: KONINKLIJKE PHILIPS N.V., Eindhoven (NL)

(72) Inventor: Claas Bontus, Hamburg (DE)

(73) Assignee: KONINKLIJKE PHILIPS N.V., Eidhoven (NL)

( * ) Notice: Subject to any disclaimer, the term of this patent is extended or adjusted under 35 U.S.C. 154(b) by 304 days.

(21) Appl. No.: 17/296,589

(22) PCT Filed: Nov. 19, 2019

(86) PCT No.: PCT/EP2019/081703
§ 371 (c)(1),
(2) Date: May 25, 2021

(87) PCT Pub. No.: WO2020/109061
PCT Pub. Date: Jun. 4, 2020

(65) Prior Publication Data
US 2022/0005239 A1 Jan. 6, 2022

(30) Foreign Application Priority Data
Nov. 28, 2018 (EP) .................................... 18208831

(51) Int. Cl.
*G06T 11/00* (2006.01)
(52) U.S. Cl.
CPC .......... *G06T 11/006* (2013.01); *G06T 11/005* (2013.01); *G06T 2210/41* (2013.01); *G06T 2211/421* (2013.01); *G06T 2211/424* (2013.01)
(58) Field of Classification Search
CPC . G06T 11/005; G06T 11/006; G06T 2210/41; G06T 2211/421; G06T 2211/424
See application file for complete search history.

(56) References Cited

U.S. PATENT DOCUMENTS

2006/0013459 A1 1/2006 Katscher
2012/0155728 A1 6/2012 DeMan
(Continued)

FOREIGN PATENT DOCUMENTS

CN 102376097 A 3/2012
CN 106683144 A 5/2017
(Continued)

OTHER PUBLICATIONS

Zhang et al: "A hybrid metal artifact reduction algorithm for x-ray CT", 2013 (Year: 2013).*
(Continued)

*Primary Examiner* — Ruiping Li
(74) *Attorney, Agent, or Firm* — Larry Liberchuk (57) ABSTRACT

The invention refers to providing a system that allows to reduce the computational costs when using an iterative reconstructional algorithm. The system (100) comprises a providing unit (110) for providing CT projection data, a base image generation unit (120) for generating a base image based on the projection data, a modifying unit (130) for generating a modified image, wherein an image value of a voxel of the base image is modified based on the image value of the voxel, and an image reconstruction unit (140) for reconstructing an image using an iterative reconstruction algorithm that uses the modified image as a start image. Since the modifying unit is adapted to modify the base image, the base image can be modified such as to form an optimal start image for the chosen iterative reconstruction such that a faster convergence of the iterative reconstruction can be accomplished.

13 Claims, 4 Drawing Sheets

(56) References Cited

U.S. PATENT DOCUMENTS

| | | |
|---|---|---|
| 2013/0077847 A1 | 3/2013 | Hansis |
| 2013/0343672 A1 | 12/2013 | Yu |
| 2017/0243380 A1 | 8/2017 | Proksa |
| 2017/0340287 A1* | 11/2017 | Fulton .................... A61B 5/721 |

FOREIGN PATENT DOCUMENTS

| | | |
|---|---|---|
| CN | 107928694 A | 4/2018 |
| WO | WO2018040126 A1 | 3/2018 |

OTHER PUBLICATIONS

PCT International Search Report, International application No. PCT/EP2019/081703, dated Dec. 12, 2019.

Zhang Y. et al., "A Hybrid Metal Artifact Reduction Algorithm for X-Ray CT ", Medi Cal Physics, AIP, Melville, NY, US, vol. 40, No. 4, Apr. 1, 2013, pp. 41910-41910, XP012171113.

Lemmens C. et al., "Suppression of Metal Streak Artifacts in CT Using a MAP Reconstruction Procedure", 2006 IEEE Nuclear Science Symposium Conference Record; Oct. 29-Nov. 4, 2006; San Diego, CA, USA, IEEE Service Center, Piscataway, NJ, USA, Oct. 29, 2006, pp. 3431-3437, XP031606369.

Brown K. M. et al., "Acceleration of ML Iterative Algorithms for CT by the Use of Fast Start Images", Proceedings of SPIE, vol. 8313, Feb. 23, 2012, p. 831339, XP055129034.

Bernhard B. et al., "Penalized Maximum Likelihood Reconstruction for X-Ray Differential Phase-Contrast Tomography", Medical Physics, AIP, Melville, NY, US, vol. 43, No. 1, Dec. 22, 2015, pp. 188-194, XP012211134.

Moore J. W. et al., "Adaptive X-Ray Computed Tomography Item Type Electronic Dissertation; text", PhD Thesis, Nov. 3, 2011, pp. 1-176, XP055648441.

Kabus S. et al., "Evaluation of 4D-CT Lung Registration", MICCAI 2009, Lecture Notes in Computer Science, vol. 5761, pp. 747-754, 2009.

Fessler J.A. et al., "Statistical Image Reconstruction Methods for Transmission Tomography", Handbook of Medical Imaging, vol. 2, chapter 1, pp. 1-70, 2000.

Kuang Z. et al., "Design and Research for CT and PET Detector Testing Platform of High-resolution Breast PET/CT", China Master's Theses Full-text Database Medicine and Health Sciences, No. 03, pp. E072-67.

\* cited by examiner

SYSTEM FOR RECONSTRUCTING AN IMAGE OF AN OBJECT

FIELD OF THE INVENTION

The invention relates to a system, a method and a computer program for reconstructing an image of an object.

BACKGROUND OF THE INVENTION

In medical imaging, in particular in medical imaging using CT systems, often iterative reconstruction algorithms are used for reconstructing an image of the patient. These iterative reconstruction algorithms comprise a large computational complexity. Thus, for reconstructing an image using an iterative reconstruction algorithm the computational costs, i.e. the necessary computational time and the necessary computational resources, are quite high. Accordingly, it would be advantageous to provide a system that allows to reduce the computational costs when reconstructing an image with an iterative reconstruction algorithm.

SUMMARY OF THE INVENTION

It is an object of the present invention to provide a system, a method and a computer program that allows to reduce the computational costs when reconstructing an image of an object using an iterative reconstruction algorithm.

In a first aspect of the present invention, a system for reconstructing an image of an object is presented, wherein the system comprises a) a projection data providing unit for providing projection data of the object, wherein the projection data has been acquired by a CT system, b) a base image generation unit for generating a base image based on the projection data, c) a modifying unit for modifying the base image to generate a modified image, wherein for modifying the base image the modifying unit is adapted to modify an image value of a voxel of the base image based on the image value of the voxel, d) an image reconstruction unit for reconstructing an image of the object based on the projection data using an iterative reconstruction algorithm that employs the modified image as a start image for the iterative reconstruction.

Since the base image generation unit generates a base image based on the projection data, a base image can be generated that is based on the same data as the image that should be reconstructed. Accordingly, the base image gives a good first approximation of the image that should be reconstructed. Moreover, since the modifying unit is adapted to modify the base image, wherein during the modification image values of voxels of the base image are modified based on the image values of the respective voxels, the base image can be modified such as to form an optimal start image for the chosen iterative reconstruction. For instance, if the chosen iterative reconstruction converges only slowly in the presence of strong gradients, the image values of the base image can be modified such that strong gradients in the image values of the modified image, i.e. the start image, can be avoided where possible. Thus, since the image reconstruction unit for reconstructing an image of the object is adapted to reconstruct the image based on the projection data using an iterative reconstruction algorithm that employs the modified image as a start image for the iterative reconstruction, a faster convergence of the iterative reconstruction can be accomplished such that computational time and computational resources necessary for reconstructing the image are reduced.

The projection data providing unit is adapted to provide projection data of the object acquired during a CT scan of an object. The data providing unit can be, for instance, directly connected to the CT system used for acquiring the projection data and can directly provide the projection data acquired by the CT system. Moreover, the data providing unit can also be a part of the CT system acquiring the projection data. Alternatively, the data providing unit can be separate from the CT system and/or can be connected, for instance, to a storage unit storing projection data of the object that has been acquired by the CT system. Further, the data providing unit can itself be configured as a storage unit storing the projection data of the object. The object can be any object scanned by the CT system, for instance, a human being, an animal or an inanimate object, like a suitcase. In a preferred embodiment, the object is a patient and the CT system is a conventional medical CT system.

The base image generation unit is adapted to generate a base image based on the projection data. Preferably, the base image generation unit is adapted to reconstruct the base image using the projection data and any suitable reconstruction algorithm that allows for a fast and computationally inexpensive reconstruction of an image. Preferably, the base image generation unit is adapted to generate the base image by applying a filtered back-projection algorithm to the projection data. The base image can be a 2D or 3D image. Moreover, the base image comprises a plurality of voxels, i.e. volume elements, each comprising an image value representing attenuation characteristics of the part of the object corresponding to the respective voxel. The term "voxel" is in the context of this invention also used to describe a 2D pixel, i.e. picture element. Accordingly, if the base image is a 3D image, the term "voxel" refers to a volume element and if the base image is a 2D image the term "voxel" refers to a picture element. The image value can be, for instance, a grey value based on the Hounsfield scale. But also other scales for representing attenuation characteristics of an object in a reconstructed image of the object can be contemplated.

The modifying unit is adapted to modify the base image to generate a modified image. The modified image is generated by modifying image values of voxels of the base image, wherein the image value is modified based on the image value of the respective voxel. Preferably, each voxel of the base image that lies in a region of interest within the base image and comprises an image value being part of a plurality of predefined image values is modified. The region of interest can refer, for instance, to a certain structure of the object, for instance, an anatomical structure like a head of the patient, the contents of a suitcase or to the whole image. The modifying unit can be adapted to modify an image value based on the image value of the voxel, for instance, by using a mathematical function linking a modification of the image value to the image value itself. The modifying of an image value can, for instance, refer to adding or subtracting a predetermined value to the image value, wherein the predetermined value might depend on the image value. Also other, more complex modifications following more complex mathematical functions depending on the image value of the respective voxel of the base image can be implemented. Preferably, the assigning of a modification to an image value of a voxel is unique in a mathematical sense, i.e. a particular image value is modified only in one predetermined way, wherein same image values are modified the same.

Preferably, the modifying unit is adapted to modify an image value of a voxel by assigning a predetermined modified image value to the voxel, wherein the predetermined modified image value that is assigned depends on the image value of the voxel. For instance, the modifying unit can be adapted to assign a predetermined modified image value to a voxel based on an image value of the voxel by using a list linking the image value of the voxel to a predetermined modified image value. Alternatively, the link can be provided as a function linking a predetermined modified image value to an image value of a voxel. The link between an image value of a voxel and a predetermined modified image value can be chosen based on pre-knowledge of characteristics of the iterative reconstruction algorithm that are used for reconstructing the projection data of the object. For instance, if it is known that the iterative reconstruction algorithm only converges very slowly in the presence of strong gradients, or of strong local extrema, the modifying unit can be adapted to analyze the image values of the base image to find such strong gradients or extrema and provide predetermined modified image values to these image values of the base image such that strong gradients or extrema are smoothed out. In another example, if it is known that the iterative reconstruction algorithm converges only slowly if the start image is too far away from the reconstructed image, pre-knowledge on the structure or characteristics of the scanned object can be used to identify image values of the base image that belong to certain structures of the object. Predetermined modified image values can then be assigned to voxels comprising image values that belong to a respective structure such that typical characteristics of these structures of the object are more clearly reflected and the modified image represents the imaged object more accurately.

The image reconstruction unit is adapted to reconstruct an image of the object based on the provided projection data and an iterative reconstruction algorithm, wherein the modified image is used as a start image for the iterative reconstruction. During an iterative reconstruction, generally forward- and back-projections based on projection data and image data are performed during each iterative step. The start image of an iterative reconstruction is used as input for the first forward- and back-projection during the first iterative step. In a preferred embodiment, the iterative reconstruction algorithm is a maximum likelihood reconstruction algorithm. An example for a suitable maximum likelihood reconstruction can be found in the article "Statistical image reconstruction methods for transmission tomography" by J. A. Fessler, Handbook of Medical Imaging, volume 2, chapter 1, pages 1 to 70 (2000).

The projection data comprises scout scan projection data acquired during a scout scan of the object and diagnostic projection data acquired during a diagnostic scan of the object, wherein the image reconstruction unit is adapted to reconstruct the image of the object based on the scout scan projection data and the diagnostic scan projection data using the iterative reconstruction algorithm. A scout scan refers to a scan of the object that is acquired before the diagnostic scan. Generally, a scout scan is acquired in a very fast way and with a signal-to-noise ratio being lower than the signal-to-noise ratio of a diagnostic image. The projection data acquired during a scout scan can refer to 2D scout scan projection data or to 3D scout scan projection data. 2D scout scan projection data can be acquired, for instance, by moving a table of the CT system through the CT system without rotation of the gantry, and hence of the detector, of the CT system. Moreover, such 2D projection data can be acquired either with a small collimation of the radiation source or with a large collimation of the radiation source, i.e. by irradiating only a part or the entire detector of the CT system. 3D scout scan projection data can be acquired, for instance, by using a helical acquisition mode, wherein in this case the scout scan refers to a helical scout scan. A scout scan can be used for planning the diagnostic scan, for instance, for determining a region of interest in a scout image reconstructed based on the projection data from the scout scan, wherein the diagnostic scan is then confined to the region of interest determined in the scout scan. Also other functions of the scout scan can be contemplated, for instance, determining the position of an object, radiation dose calculations for the radiation dose to be provided to an object during the diagnostic scan, determining or optimizing image setting for the diagnostic scan, etc. A diagnostic scan refers to a scan of the object with image settings that allow providing a diagnosis of the object based on diagnostic images reconstructed from the projection data acquired during the diagnostic scan. These image settings can refer, for instance, to a good signal-to-noise ratio, a high resolution, a high contrast between certain structures of the object, etc.

The image reconstruction unit is adapted to reconstruct the image of the object based on the scout scan projection data and the diagnostic scan projection data using the iterative reconstruction algorithm. Since the image reconstruction unit is adapted to reconstruct the image of the object based not only on the diagnostic projection data but also on the scout scan projection data, the iterative reconstruction can be based on a greater data basis. For instance, in an axial scan with a cone-beam CT system the diagnostic projection data obtained is not complete in a mathematical sense. This incompleteness can lead to artifacts in a reconstructed image, especially in regions of the human body with high gradients along or parallel to the axis of rotation. While iterative algorithms can minimize these artifacts, it usually takes an inappropriate number of iterations for obtaining sufficient image quality. Incorporating the scout scan projection data can reduce the incompleteness partly or completely. Thus, providing additional data from a scout scan can facilitate the convergence of the iterative reconstruction algorithm. Moreover, a reconstruction image with a higher image quality, i.e. with fewer artifacts, can be received from the reconstruction.

The scout scan projection data can, for instance, be used as further input to the forward and backward iterations of the iterative reconstruction algorithm during each iteration step. In iterative algorithms, forward- and back-projections are performed in each iteration step. It is preferred that these forward- and back-projections take into account the diagnostic projection data and the scout scan projection data. For instance, for updating the value of one particular voxel during an iteration step diagnostic projection data associated with rays passing through that voxel are considered for these forward- and back-projections, wherein, if scout scan projection data exist for this particular voxel, also the scout scan projection data is considered.

In an embodiment, during the iterative reconstruction the scout scan projection data receives a lower weight than the diagnostic projection data. Since the scout scan projection data generally provides a lower signal-to-noise ratio providing a lower weight to the scout scan projection data during the iterative reconstruction ensures that for regions of the object for which diagnostic projection data with a good coverage and a good signal-to-noise ratio exist, the iterative reconstruction algorithm will base the reconstruction of the image mainly on the diagnostic projection data. But, in regions with a low coverage of diagnostic projection data, for instance, at the edges of the diagnostic scan region, or in regions in which the diagnostic projection data is truncated, even low-weighted scout scan projection data will have an influence on the reconstruction of the image. For regions with high gradients along or parallel to a rotation axis of a CT system, with which the projection data was acquired, incorporation of scout scan projection data can reduce artifacts typically resulting from these gradients even if the scout scan data is used with low weights.

In an embodiment, the scout scan projection data was acquired during a helical scout scan. If the scout scan projection data was acquired during a helical scout scan, a full set of projection data for the object is provided by the scout scan projection data. Accordingly, a 3D image can be reconstructed from the scout scan projection data. In a preferred embodiment, the base image generating unit is adapted to generate the base image based on the scout scan projection data. Since the scout scan projection data has to be reconstructed into a scout scan image for planning the acquisition of the diagnostic image, if the base image generation unit is adapted to generate the base image based on the scout scan projection data, it is not necessary to reconstruct a further image, i.e. a base image, for the later iterative reconstruction. Accordingly, no further computational costs are generated for providing the base image. In this embodiment, the scout scan projection data refers to 3D scout scan projection data acquired, for instance, during a helical scout scan.

Preferably, the image reconstruction unit is further adapted to register the modified image with an initial reconstruction of the diagnostic projection data and to use the registered modified image as a start image. Since the scout scan projection data and the diagnostic projection data are acquired during different scans, a movement of the object, for instance, the patient, might have occurred between the scans. To ensure that the modified image comes as near as possible to the final reconstructed image, it is preferred that it is compensated for such movements, if necessary. This can be done during the registration of the modified image with an initial reconstruction of the diagnostic projection data. The initial reconstruction can, for instance, refer to an image after only a few iterations of the iterative algorithm, for instance, after the first iteration. The iteration for providing the initial reconstruction can be initiated from an arbitrary start image, for instance, from a start image comprising only one image value. Alternatively, the initial reconstruction can be based on another reconstruction algorithm, for instance, on a filtered back-projection algorithm applied to the diagnostic projection data. Such an initial reconstruction may be only a very rough estimate of the object. The registration between the modified image and the initial reconstruction can be performed using any suitable known registration algorithm. For instance, during the registration highly attenuating objects or regions with a high contrast can be identified in the modified image and in the initial reconstruction, and the registration can be based on these highly attenuating objects, like bone or metal objects. One example of a suitable registration algorithm is described, for instance, in the article "Evaluation of 4D-CT Lung Registration" by S. Kabus et al., MICCAI 2009, Lecture Notes in Computer Science, Volume 5761, pages 747 to 754 (2009). Moreover, the image reconstruction unit can be further adapted to use the registered modified image to register the scout scan projection data with the diagnostic scan projection data and to apply the iterative algorithm to the registered scout scan projection data and the diagnostic projection data. For instance, if a registration is known between the modified image and the initial reconstruction of the diagnostic projection data, also the registration between the base image that was not modified and the diagnostic projection data can be determined. Thus, further also the registration of the scout scan projection data and the diagnostic projection data is known. Therefore, the reconstruction of the image using the iterative reconstruction algorithm can be based on registered scout scan projection data and diagnostic projection data compensating for movements of a patient that might have occurred between the acquisition of the scout scan projection data and the diagnostic projection data.

In an embodiment, the modifying unit is adapted to determine if an image value of a voxel lies within a predetermined image value range, and to modify the image value of the voxel based on a result of the determination. The predetermined image value range can be defined by providing two image value thresholds. Moreover, the predetermined image value range can also be defined by one image value threshold, wherein all image values below or above the image value threshold fall within the image value range. Preferably, more than one image value range can be predetermined, wherein the predetermined image value ranges do not overlap. The predetermined image value ranges can be chosen, for instance, such that an upper boundary threshold of one image value range refers to the lower image value threshold of another image value range, wherein in such a case it is also determined to which image value range the image value threshold itself belongs. An image value of a voxel can then be modified in one way based on the determination that an image value of a voxel lies within a respective predetermined image value range, wherein an image value of a voxel can be modified in another way if the image value of the voxel lies within another respective predetermined image value range. If a predetermined image value range is defined by two image value thresholds, the modifying unit is adapted to determine if an image value of a voxel lies within the predetermined image value range by comparing the image value of the voxel with the two image value thresholds of the predetermined image value range. In particular, the modifying unit is adapted to determine if the image value of the voxel is greater than the lower image value threshold of the predetermined image value range and less than the higher image value threshold of the predetermined image value range, wherein then the image value of the voxel lies within the predetermined image value range. If the image value range is determined by only one threshold such that all image values greater or less than the image value threshold lie within the predetermined image value range, the modifying unit is adapted to determine if an image value of a voxel lies within the predetermined image value range by comparing the image value of the voxel to the image value threshold and, if the image value of the voxel is greater or less than the image value threshold of the predetermined image value range, to determine that the image value of the voxel lies within the predetermined image value range.

The modifying unit is then adapted to modify the image value of the voxel based on the result of the determination. For instance, if the result of the determination is that the image value of the voxel falls within the predetermined image value range, the modifying unit can be adapted to modify the image value of the voxel. Preferably, the modifying unit is adapted, if the result of the determination is that the image value of the voxel falls within the predetermined image value range, to modify the image value of the voxel by assigning a predetermined modified image value to the voxel. In another example, if the result of the determination is that the image value of the voxel does not fall within the predetermined image value range, the modifying unit can be adapted to not modify the image value of the voxel, preferably to not assign a modified image value to the voxel.

In a preferred embodiment, the predetermined image value range is based on characteristics of the object. The characteristics of the imaged object can refer, for instance, to structural characteristics of the imaged object or to compositional characteristics of the imaged object. For instance, if the object is a patient, the characteristics of the imaged object can refer to certain tissues like bone tissue, muscle tissue, or organ tissue, that are expected in the imaged region of the object. Accordingly, it is possible to modify only image values of the base image for which it is known that they lie within a certain image value range, for instance, an image value range that is known to cause problems during the iterative reconstruction. Moreover, if the image value range is based on characteristics of the imaged object, characteristics of the imaged object that are already known can be taken into account when determining an image value range that might cause problems during the iterative reconstruction.

In a preferred embodiment, the modifying unit is adapted to modify an image value of a voxel of the base image further based on characteristics of image values of all voxels in a region of interest in the base image lying in the predetermined image value range. The characteristics of the image values of the base image lying in the predetermined image value range can refer, for instance, to a distribution of the image values of the base image lying in the predetermined image value range, to a mean value of the image values of the base image lying in the predetermined image value range or to other statistical analytical values that can be acquired based on the image values of the base image lying in the predetermined image value range. For instance, if the characteristics of the image values of the base image in the predetermined image value range show a substantially even distribution, the image value of voxels lying in that range can be modified to a constant predetermined modified image value. Preferably, in such a case the modifying unit is adapted to modify an image value of a voxel by assigning a predetermined modified image value to the voxel being, for instance, a mean image value of all image values of the base image in the predetermined image value range. Or, for instance, if the characteristics of the image values of the base image in the predetermined image value range show that substantially all image values of the base image in the predetermined image value range comprise the same image value, for instance, an image value lying in the upper third of the predetermined image value range, the modifying unit can be adapted to assign a predetermined modified image value to all voxels comprising an image value in the predetermined image value range that refers to this specific image value. Also other embodiments can be contemplated in which, for instance, the modified image values show a more complex dependency on the characteristics of the image values of the base image in the predetermined image value range.

In a preferred embodiment, the modifying unit is adapted to modify an image value of each voxel of the base image within a region of interest that comprises an image value within the predetermined image value range by assigning a predetermined modified image value to the voxel. The predetermined modified image value can then be, for instance, a value that is determined based on pre-knowledge on characteristics of the object or based on characteristics of the image values of the base image in the predetermined image value range. If the object is a patient, the predetermined modified image value can, for instance, refer to a known mean image value that is expected for soft tissue.

In an embodiment, the modifying unit is adapted to modify an image value of voxels of the base image within a region of interest by assigning a first modified image value to each voxel of the region of interest comprising an image value in a first image value range corresponding to vacuum or air, and by assigning a second modified image value to each voxel of the region of interest comprising an image value in a second image value range corresponding to soft tissue. The first image value range corresponding to vacuum or air can be defined, for instance, as comprising all voxels comprising image values below −530 HU, and the second image value range corresponding to soft tissue can be defined, for instance, by comprising all voxels comprising image values between −530 HU and 560 HU. The first modified image value can then correspond to an image value for vacuum or air being defined as −1000 HU. The second modified image value can be defined by a known typical image value of soft tissue, for instance, organ tissue or muscle tissue and can, for instance, be chosen as 25 HU. It has been found by the inventors that in such an embodiment the convergence of an iterative reconstruction algorithm can be especially improved.

In a further aspect of the present invention, a method for reconstructing an image of an object is presented, wherein the method comprises the steps of a) providing projection data of the object, wherein the projection data has been acquired by a CT system, b) generating a base image based on the projection data, c) modifying the base image to generate a modified image, wherein for modifying the base image an image value of a voxel of the base image is modified based on the image value of the voxel, d) reconstructing an image of the object, wherein the image is reconstructed based on the projection data using an iterative reconstruction algorithm that uses the modified image as a start image for the iterative reconstruction.

In a further aspect of the present invention, a computer program for reconstructing an image of an object is presented.

It shall be understood that the system of claim 1 and the method of claim 13 for reconstructing an image of an object have similar and/or identical preferred embodiments, in particular as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
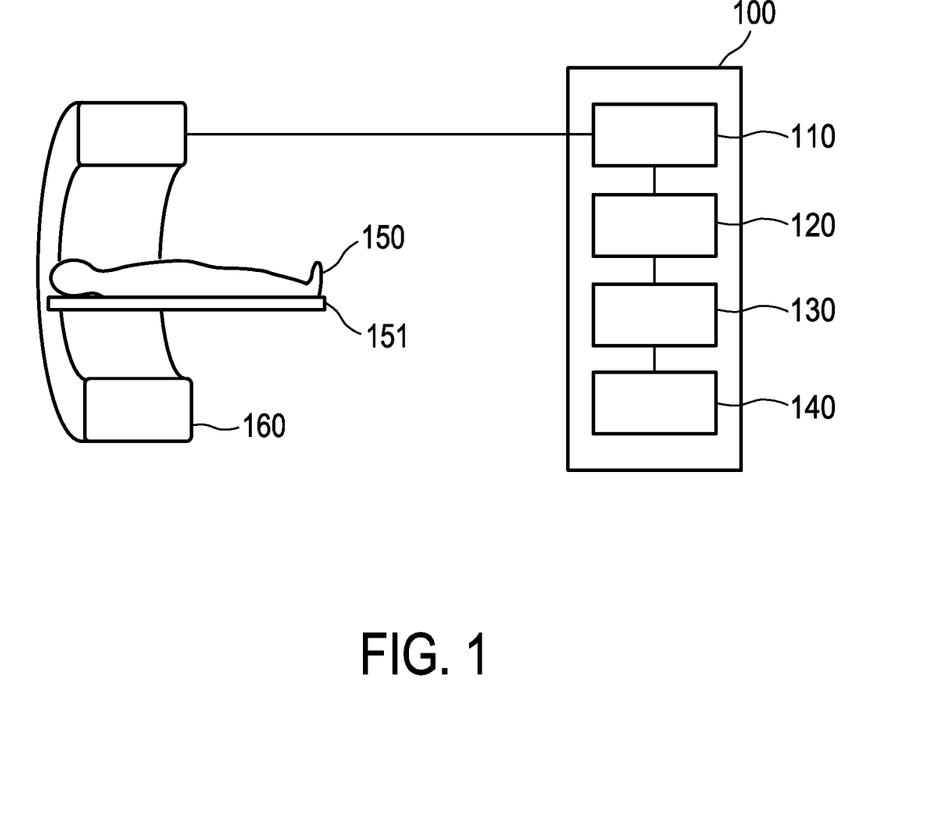
FIG. 1 shows schematically and exemplarily an embodiment of a system for providing an image of an object.

FIG. 1 shows schematically and exemplarily an embodiment of a system for reconstructing an image of an object.

In this embodiment, the system 100 is adapted to reconstruct an image of a patient 150 lying on a support means 151, like a patient table. In other embodiments the object can also be an animal or an inanimate object. The system 100 comprises a projection data providing unit 110 providing projection data of the patient 150 acquired by a CT system 160 during a CT scan of the patient 150. Further, the system 100 comprises a base image generation unit 120, a modifying unit 130 and an image reconstruction unit 140.

In a first embodiment the data providing unit 110 is adapted to provide as projection data diagnostic projection data acquired during a diagnostic scan of the object, wherein no scout scan was performed before the diagnostic scan of the patient 150. The base image generation unit 120 is then adapted to generate a base image based on the provided projection data referring to the diagnostic projection data by, for instance, applying a filtered back-projection algorithm to the projection data.

In this embodiment, the modifying unit 130 is adapted to assign predetermined modified image values to voxels of the base image based on image values of the voxels. In the embodiment described here, a first and a second image value range is determined. The first image value range is determined to comprise all voxels of the base image comprising image values that are expected to represent air and the second image value range is determined to comprise all voxels of the base image comprising image values that are expected to represent soft tissue of the patient 150, for instance, organ tissue or muscle tissue. Accordingly, for the first image value range an upper image value threshold of −530 HU is chosen, wherein the first image value range is defined as comprising all voxels of the base image comprising image values below the chosen upper image value threshold. For the second image value range a lower image value threshold of −530 HU and an upper threshold of 560 HU is chosen in this embodiment. Further, in this embodiment the modifying unit 130 is adapted to provide a first modified image value and a second modified image value to all voxels of the base image comprising an image value in the first image value range and in the second image value range, respectively. As representation for air a first modified image value of −1000 HU is assigned by the modifying unit 130 to each voxel of the base image comprising an image value within the first image value range. As representation for soft tissue, a second modified image value of 25 HU is assigned by the modifying unit 130 to each voxel of the base image comprising an image value within the second image value range. Accordingly, voxels of the base image comprising image values lying in neither of the first and the second image value range are left unchanged.

In this embodiment, the modifying unit 130 modifies the base image in accordance with the above rules to generate a modified image. The modified image in this case refers to an image in which voxels comprising image values referring to air or soft tissue comprise a representative constant value, respectively. The image reconstruction unit 140 then reconstructs an image of the patient 150 based on the projection data provided by the projection data providing unit 110 using an iterative reconstruction algorithm, preferably a maximum likelihood reconstruction algorithm, wherein the modified image is used as a start image for the iterative reconstruction. It has been found by the inventors that the above described modification of the base image leads to an especially fast and accurate reconstruction of a CT image using an iterative reconstruction, preferably a maximum likelihood reconstruction. A result for such a reconstruction using a modified image as a start image for an iterative reconstruction algorithm generated in accordance with the above described embodiment is shown in FIG. 2.

Figure 2:
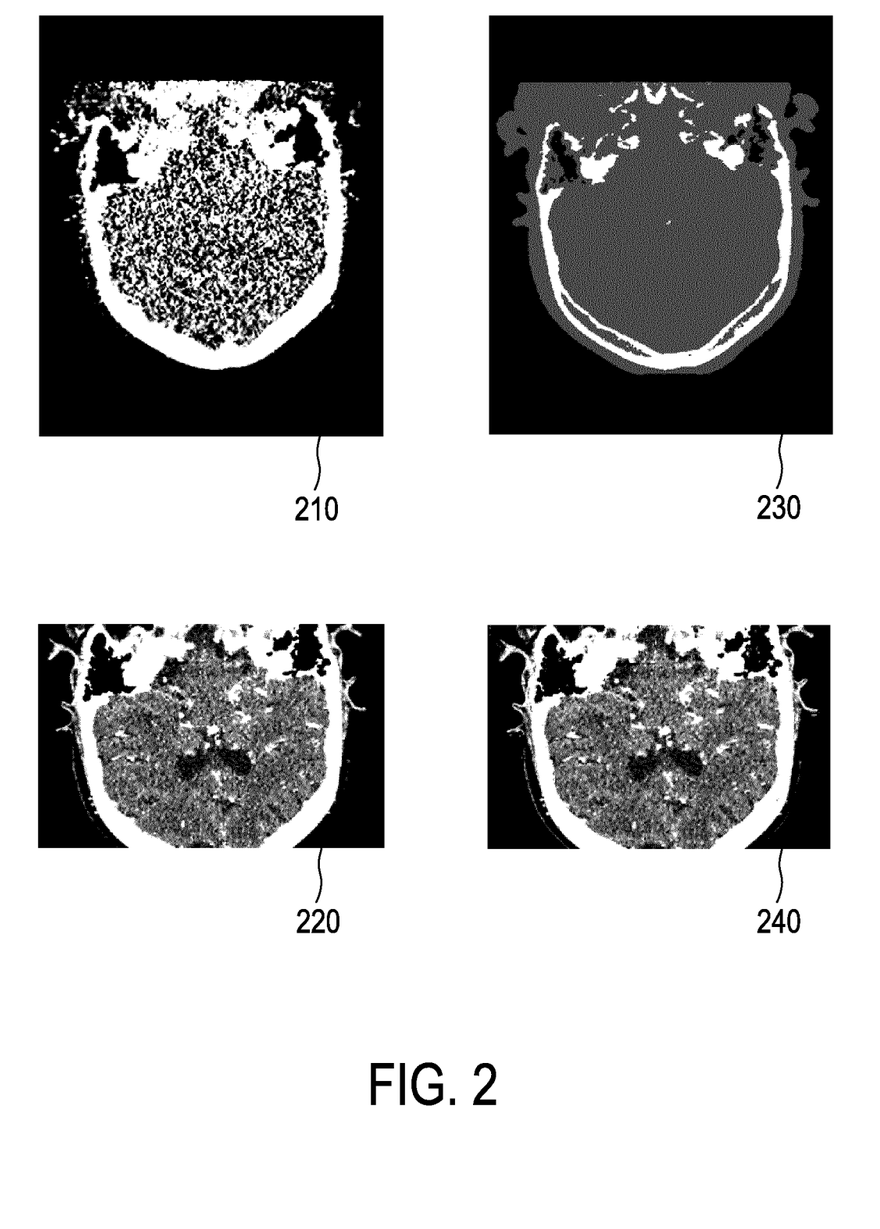
FIG. 2 shows exemplary results of an image reconstruction in accordance with an embodiment of the system.

Image 210 in the upper left corner of FIG. 2 shows a conventional start image used for a maximum likelihood iterative reconstruction algorithm, wherein the conventional start image is acquired, for instance, by using a filtered back-projection algorithm on the projection data. The image 210 is shown with a level of 350 HU and a window of 70 HU. Image 220 in the lower left corner of FIG. 2 shows a reconstructed image, wherein the image was iteratively reconstructed using the conventional start image 210. The image 220 is shown after 100 iterations, also with a level of 35 HU and a window of 70 HU. Image 230 in the upper right corner of FIG. 2 shows a modified image generated in accordance with the above described embodiment. It can be seen that in comparison to the conventional start image 210 the modified image 230 shows a clear delineation between the different structures of the patient, i.e. between air, soft tissue and bone. Image 240 in the lower right corner of FIG. 2 shows a reconstruction result that is based on image 230 as start image, wherein also for this reconstruction a maximum likelihood iterative reconstruction was used. It can be seen that the image 220 and the image 240 are nearly identical, wherein the image 240 reconstructed based on the modified image 230 as start image only needed 20 iterations for reconstruction. Accordingly, the computational effort necessary for reconstructing a CT image can be strongly reduced with a modified start image as represented, for instance, by the modified image 230.

In an embodiment of the invention as described above, the projection data providing unit 110 is adapted to provide projection data of the object comprising scout scan projection data acquired during a helical scout scan of the patient 150 and diagnostic projection data acquired during a diagnostic scan of the patient 150. In this embodiment, the base image generation unit 120 can be adapted to generate the base image based on the scout scan projection data. The modifying unit 130 can then modify the base image generated based on the scout scan projection data as already described above. The effect of using a base image generated based on scout scan projection data is shown in FIG. 3.

Figure 3:
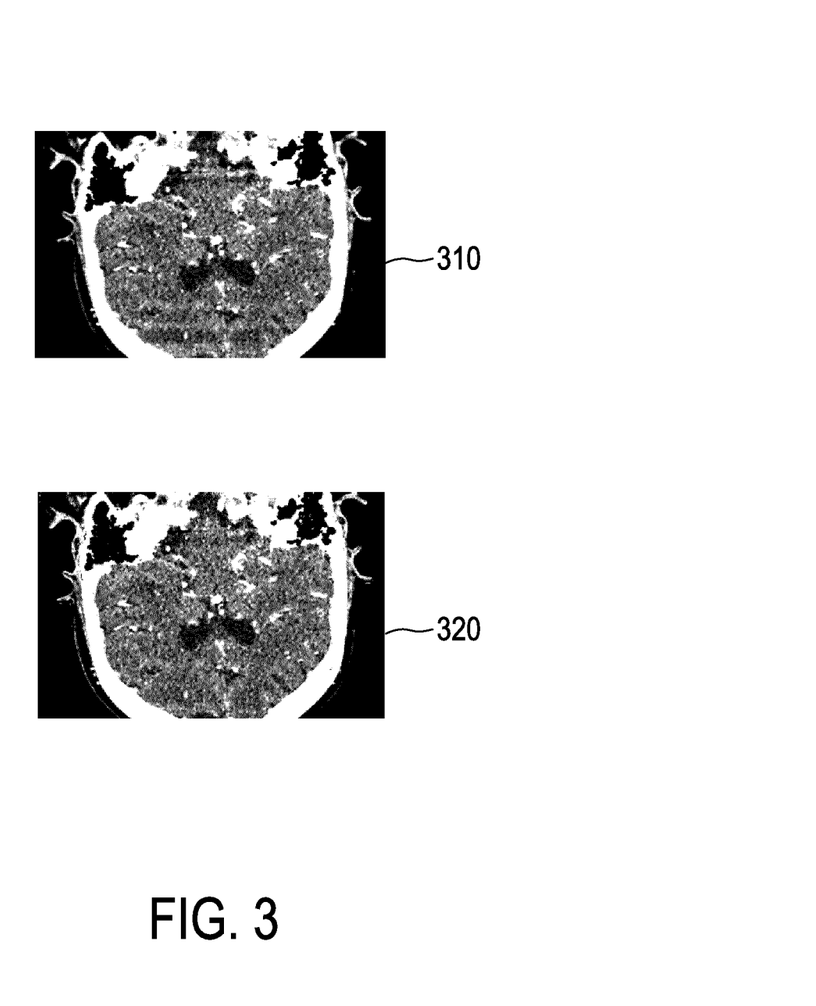
FIG. 3 shows exemplary results of an image reconstruction in accordance with another embodiment of the system.

The image 310 in FIG. 3 shows a conventionally reconstructed axial CT scan image, whereas the image 320 shows a reconstructed image reconstructed based on the same projection data as the image 310, with the difference that as start image an image reconstructed from scout scan projection data was used. To clearly show the effects of providing a base image generated based on scout scan projection data, the image 310 was reconstructed without modifying the base image, such that the base image generated from the scout scan projection data was directly used as start image for the iterative reconstruction. In a comparison between the image 310 and the image 320 it can be seen that the image 320 based on the reconstruction using the scout scan image as start image shows less artifacts. Accordingly, generating a base image based on scout scan projection data can lead to a more accurate reconstruction result.

Moreover, additionally or alternatively to generating the base image based on the scout scan projection data, the image reconstruction unit 140 can be adapted to reconstruct the image of the patient 150 based on the scout scan projection data and the diagnostic projection data. In this embodiment for reconstructing the image, the image reconstruction unit 140 is also adapted to first register the scout scan projection data with the diagnostic projection data, since for a patient movements between the acquisition of the scout scan projection data and the diagnostic projection data are likely. In other embodiments where no movements are likely, for instance, if the object is a suitcase, the registration can be omitted. For registering the scout scan projection data and the diagnostic projection data the image reconstruction unit 140 can be adapted to use an already determined modified image that is determined based on the scout scan projection data, i.e. a base image reconstructed based on the scout scan projection data, or, if the modified image is not based on the scout scan projection data, can be adapted to reconstruct a scout scan image based on the scout scan projection data using, for instance, a filtered back-projection algorithm. Moreover, the image reconstruction unit 140 can be adapted to provide an initial reconstruction image based on the diagnostic projection data, wherein the initial reconstruction image can be reconstructed by applying a filtered back-projection algorithm to the diagnostic projection data, or by applying on the diagnostic projection image a few iterations of the iterative algorithm based on an arbitrary start image. The image reconstruction unit 140 can then determine image structures like highly attenuating structures resulting from bone or metal in the initial reconstruction image and in the reconstructed image based on the scout scan projection data. Based on the determined image structure both images can then be registered, i.e. the reconstructed image based on the scout scan projection data. For instance, the modified image, is translated and/or rotated to correspond to the initial reconstruction image. The scout scan projection data can then be registered accordingly to the diagnostic projection data.

The image reconstruction unit 140 is then adapted to reconstruct the image based on the registered scout scan projection data and the diagnostic projection data. For instance, the scout scan projection data can be used in addition to the diagnostic projection data during the forward- and back-projecting in each iteration step. For instance, for updating a value of one particular voxel during an iteration step, i.e. during the forward- and back-projecting, data associated with rays passing through that voxel is considered, wherein, if scout scan projection data exists for this voxel, this scout scan projection data is incorporated in addition to the diagnostic projection data. Further, in this embodiment the image reconstruction unit 140 is adapted to provide a weight to the projection data during each iterative step, wherein the scout scan projection data is weighted lower than the diagnostic projection data. Reconstructing the image based on the above embodiment leads to a reconstructed image showing less image artifacts.

Figure 4:
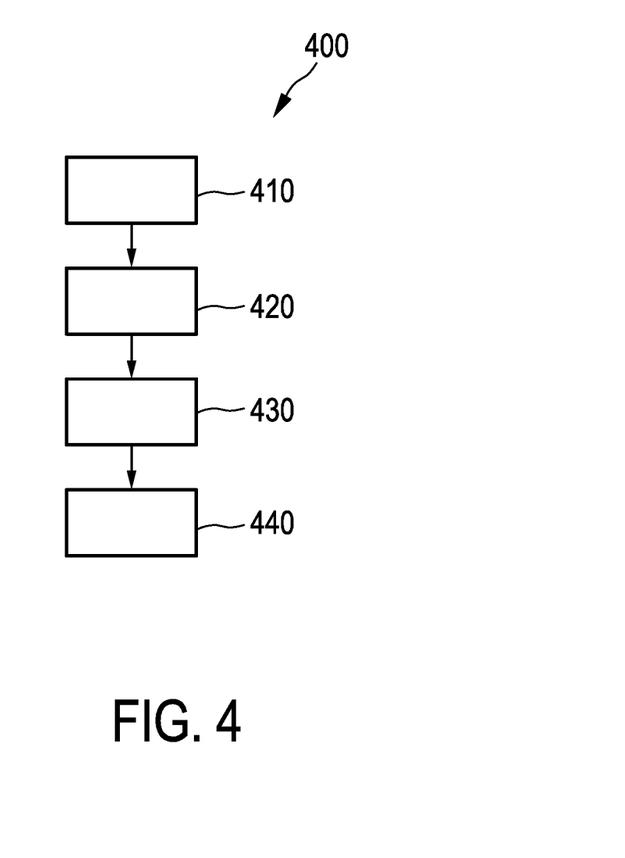
FIG. 4 shows a flowchart exemplarily illustrating an embodiment of a method for providing an image of an object.

FIG. 4 shows a flowchart exemplarily illustrating an embodiment of a method for reconstructing an image of an object. The method 400 comprises a first step 410 of providing the projection data of the patient 150 that has been acquired during a CT scan using the CT system 160. The projection data is provided by the projection data providing unit 110 that is connected to the CT system 160. In a second step 420 a base image is generated based on the provided projection data. This base image is then modified in step 430 to generate a modified image. The modification comprises assigning modified image values to voxels of the base image based on image values of the voxels. In a final step 440 the image of the patient 150 is reconstructed based on the projection data, wherein an iterative reconstruction algorithm is used using the modified image as the start image for the iterative reconstruction.

In CT image reconstruction, iterative reconstruction algorithms can be very important for certain applications, for instance, where very low patient radiation doses are necessary. For such low dose images or for minimizing cone beam artifacts in axial scans, in particular maximum likelihood image reconstruction algorithms are suitable. But, since these maximum likelihood image reconstruction algorithms have a large computational complexity, i.e. require large computational efforts, it is advantageous to get results after a least possible number of iterations.

In the present invention it is proposed, for instance, to obtain a specifically modified image as start image for an iterative reconstruction of CT projection data, wherein a base image on which the modification is based is obtained, for instance, by using a filtered back-projection algorithm. Further, an algorithm is proposed that modifies the base image to provide a modified image, wherein this base image is modified based on carefully chosen image value thresholds, i.e. image value ranges. Preferably, a set of thresholds, i.e. a set of image value ranges, is chosen based on absorption coefficients, i.e. image values. For instance, thresholds, i.e. image value ranges, can be chosen which serve for differentiating between vacuum/air, soft tissue and bone. Further, it is proposed to choose a modified absorption coefficient, i.e. modified image value, which represents an image value of soft tissue. Moreover, a base image is chosen that is suitable for being used in an iterative reconstruction. This base image is then modified based on the above chosen thresholds, i.e. image value ranges. For instance, every voxel of the base image associated with vacuum/air, i.e. comprising an image value lying within a first image value range, is set to −1000 HU, wherein every voxel of the base image comprising an image value associated with soft tissue is set to the modified image value representing soft tissue, wherein further all voxels lying outside the chosen image value ranges are associated with bone and are left unchanged. The such modified image is then used as a start image for the iterative reconstruction.

In an embodiment of the present invention, in addition to diagnostic projection data also scout scan projection data is acquired during a scout scan of an object. The iterative reconstruction algorithm for reconstructing the CT image is then adapted such that it incorporates the scout scan projection data from the scout scan. Such a scout scan can be performed in different ways. For instance, the scout scan projection data can be obtained on a linear segment using a small collimation, wherein in this case the scout scan projection data is acquired whilst a patient table moves but without a rotation of a gantry of the CT system. Further, scout scan projection data can be obtained on a linear segment with large collimation, wherein in this case the entire detector of the CT system is illuminated in each view. In a further example, scout scan projection data can be obtained during a helical scout scan. Each of these exemplary acquisitions is suitable for being used with the invention as proposed here. Nevertheless, acquiring the scout scan projection data with a large collimation or in a helical scout scan allows to acquire a complete scout scan projection data set. For instance, the scout scan projection data set of the scout scan projection data acquired using a large collimation can be completed by a combination with the respective diagnostic projection data from the diagnostic scan, whereas the scout scan projection data obtained during the helical scout scan alone yields a complete scout scan projection data set.

Iterative reconstruction algorithms for reconstructing CT images calculate forward- and back-projections in each iteration step. The scout scan projection data acquired during the scout scan can then be used as additional projection data in these forward- and back-iterations. Moreover, a noise model can be incorporated into the iterative reconstruction algorithm, being preferably a maximum likelihood reconstruction algorithm that ensures that the scout scan projection data receives a lower weight than the diagnostic projection data, since generally the scout scan projection data is acquired using a lower x-ray dose. Nevertheless, for regions with a large density, like regions comprising bone, which conventionally lead to cone beam artifacts, incorporating the scout scan projection data can make a difference even if the scout scan projection data receives a smaller weight than the diagnostic scan projection data.

Moreover, if the acquired scout scan projection data yields a complete projection data set, for instance, like the scout scan projection data acquired during a helical scout scan, the scout scan projection data can also be used for generating the base image. For instance, the base image can be generated by providing a filtered back-projection algorithm to the scout scan projection data. In this case, to mitigate problems that are due to patient motion in between the acquisition of the scout scan and the diagnostic scan, it is advantageous to provide a registration between the scout scan projection data and the diagnostic scan projection data as part of the iterative algorithm. The registration can, for instance, consist of identifying bone and/or other high contrast parts in a base image or modified image that are based on the scout scan projection data as well as in an initial reconstruction of the diagnostic projection data. Based on this registration the base image or the modified image can be scaled and translated such that it best fits with the initial reconstruction. This registered base image or registered modified image is then used as a start image for the iterative reconstruction.

Although in the above embodiments the object to be imaged by a CT system is a patient, in other embodiments the object might be an animal or an inanimate object like a suitcase. In the latter case the modified image values or the predetermined image value ranges might be defined based on characteristics of the inanimate object, for instance, based on expected contents of a suitcase. Image value ranges might be defined in this case, for instance, based on image values representing vacuum/air, image values representing, for instance, clothing and image values representing, for instance, metal objects.

Although in the above embodiments two image value ranges are determined, in other embodiments only one image value range might be determined, or more than two image value ranges might be determined, for instance, if the imaged object comprises more than two structures comprising different expected attenuation characteristics. Moreover, the determination of an image value range can be omitted and the base image can be modified based, for instance, on a function linking an image value of a voxel of the base image to a modification of the image value or to a modified image value, wherein the modifying unit is then adapted to modify the base image by modifying the image value of the voxel based on the provided function. The function can also be provided as a list for linking an image value of a voxel of the base image to a modification of the image value or to a modified image value that is stored in a storage unit and provided to the modifying unit.

Although in the above embodiments, the scout scan projection data is acquired during a helical scout scan, in other embodiments the scout scan projection data can also be acquired during other scout scan modes. The scout scan projection data can then refer to 2D or 3D scout scan projection data.

Other variations to the disclosed embodiments can be understood and effected by those skilled in the art in practicing the claimed invention from the study of the drawings, the disclosure, and the appendant claims.

In the claims, the word "comprising" does not exclude other elements or steps, and the indefinite article "a" or "an" does not exclude a plurality.

A single unit or device may fulfill the functions of several items to be cited in the claims. The mere fact that certain measures are recited in mutually different dependent claims does not indicate that a combination of these measures cannot be used to advantage.

Procedures like the generating of a base image or the providing of projection data performed by one or several units or devices can be performed by any other number of units or devices. These procedures and/or the operations of the system can be implemented as program code means of a computer program and/or as dedicated hardware.

A computer program may be stored/distributed in a suitable medium, such as an optical storage medium or a solid-state stored medium, supplied together with or as part of other hardware, but may also be distributed in other forms, such as via the Internet or other wired or wireless telecommunication systems.

Any reference signs in the claims should not be construed as limiting the scope.

The invention refers to providing a system that allows to reduce the computational costs when using an iterative reconstruction algorithm. The system comprises a providing unit for providing CT projection data, a base image generation unit for generating a base image based on the projection data, a modifying unit for generating a modified image, wherein an image value of a voxel of the base image is modified based on the image value of the voxel, and an image reconstruction unit for reconstructing an image using an iterative reconstruction algorithm that uses the modified image as a start image. Since the modifying unit is adapted to modify the base image, the base image can be modified such as to form an optimal start image for the chosen iterative reconstruction such that a faster convergence of the iterative reconstruction can be accomplished.

The invention claimed is:

1. A system for reconstructing an image of an object, wherein the system comprises:
   a memory; and
   processor circuitry coupled to the memory, and configured to:
   provide projection data of the object, wherein the projection data has been acquired by a computer tomography (CT) system;
   generate a base image based on the projection data;
   modify the base image to generate a modified image, wherein for modifying the base image the processor circuitry is configured to modify an image value of a voxel of the base image based on the image value of the voxel; and
   reconstruct an image of the object based on the projection data using an iterative reconstruction algorithm that employs the modified image as a start image for an iterative reconstruction, wherein the projection data comprises scout scan projection data acquired during a scout scan of the object and diagnostic projection data acquired during a diagnostic scan of the object, wherein processor circuitry is configured to reconstruct the image of the object based on the scout scan projection data and the diagnostic scan projection data using the iterative reconstruction algorithm, wherein during the iterative reconstruction the scout scan projection data receives a lower weight than the diagnostic projection data.

2. The system according to claim 1, wherein the scout scan projection data is acquired during a helical scout scan.

3. The system according to claim 2, wherein the processor circuitry is configured to generate the base image based on the scout scan projection data.

4. The system according to claim 3, wherein the processor circuitry is configured to register the modified image with an initial reconstruction of the diagnostic projection data and to use the registered modified image as a start image.

5. The system according to claim 1, wherein the processor circuitry is configured to generate the base image by applying a filtered back-projection algorithm to the projection data.

6. The system according to claim 1, wherein the processor circuitry is configured to determine if an image value of a voxel lies within a predetermined image value range and to modify the image value of the voxel based on a result of the determination.

7. The system according to claim 6, wherein the predetermined image value range is based on characteristics of the object.

8. The system according to claim 6, wherein the processor circuitry is configured to modify an image value of a voxel of the base image further based on characteristics of image values of all voxels in a region of interest in the base image lying in the predetermined image value range.

9. The system according to claim 7, wherein the processor circuitry is configured to modify an image value of each voxel of the base image within a region of interest that comprises an image value within the predetermined image value range by assigning a predetermined modified image value to the voxel.

10. The system according to claim 1, wherein the processor circuitry is configured to modify an image value of each voxel of the base image within a region of interest by assigning a first modified image value to each voxel of the region of interest comprising an image value in a first image value range corresponding to vacuum or air, and by assigning a second modified image value to each voxel of the region of interest comprising an image value in a second image value range corresponding to soft tissue.

11. The system according to claim 1, wherein the iterative reconstruction algorithm is a maximum likelihood reconstruction algorithm.

12. A method for reconstructing an image of an object, comprising:

providing projection data of the object, wherein the projection data has been acquired by a computed tomography (CT) system, wherein the projection data comprises scout scan projection data acquired during a scout scan of the object and diagnostic projection data acquired during a diagnostic scan of the object;

generating a base image based on the projection data;

modifying the base image to generate a modified image, wherein modified image values are assigned to voxels of the base image based on image values of the voxels; and reconstructing an image of the object, wherein the image is reconstructed based on the projection data, comprising the scout scan projection data and the diagnostic scan projection data, using an iterative reconstruction algorithm that uses the modified image as a start image for an iterative reconstruction, wherein during the iterative reconstruction the scout scan projection data receives a lower weight than the diagnostic projection data.

13. A non-transitory computer-readable medium for storing executable instructions, which cause the method to be performed according to claim 12.

* * * * *